(No Model.) 3 Sheets—Sheet 1.

T. GAUNT.
EVAPORATING APPARATUS FOR SUGAR AND OTHER SUBSTANCES.

No. 302,479. Patented July 22, 1884.

Witnesses:
Inventor:

(No Model.) 3 Sheets—Sheet 3.

T. GAUNT.
EVAPORATING APPARATUS FOR SUGAR AND OTHER SUBSTANCES.

No. 302,479. Patented July 22, 1884.

Witnesses
Fred Haynes
C. L. Sundgren

Inventor
Thomas Gaunt
by his Attys
Brown & Hall

UNITED STATES PATENT OFFICE.

THOMAS GAUNT, OF NEW YORK, N. Y., ASSIGNOR OF ONE-HALF TO CORNELIUS H. DE LAMATER, WILLIAM DE LAMATER, AND GEORGE H. ROBINSON.

EVAPORATING APPARATUS FOR SUGAR AND OTHER SUBSTANCES.

SPECIFICATION forming part of Letters Patent No. 302,479, dated July 22, 1884.

Application filed February 25, 1884. (No model.)

*To all whom it may concern:*

Be it known that I, THOMAS GAUNT, of the city and county of New York, in the State of New York, have invented a new and useful Improvement in Evaporating Apparatus for Sugar and other Substances, of which the following is a specification.

This invention is applicable, generally, to evaporating apparatus in which are employed a single vacuum-pan connected with a condenser, or two or more pans combined for double or triple effect, or so that the vapor or steam escaping from one pan will effect the heating of the next pan in the series, while the other pan, or the last pan of the series, will be connected with the condenser.

Certain features of the invention relate only to a pan provided with a drum-section comprising upright tubes, which are surrounded by steam, and a large central throat or opening, the heating of the tubes by the steam surrounding them causing an active upward circulation of the liquor to be evaporated through the tubes, and a corresponding downward circulation of the liquor through the large central throat or opening.

The invention consists in various novel features of construction and combinations of parts, hereinafter described, and referred to in the claims.

Figure 1:
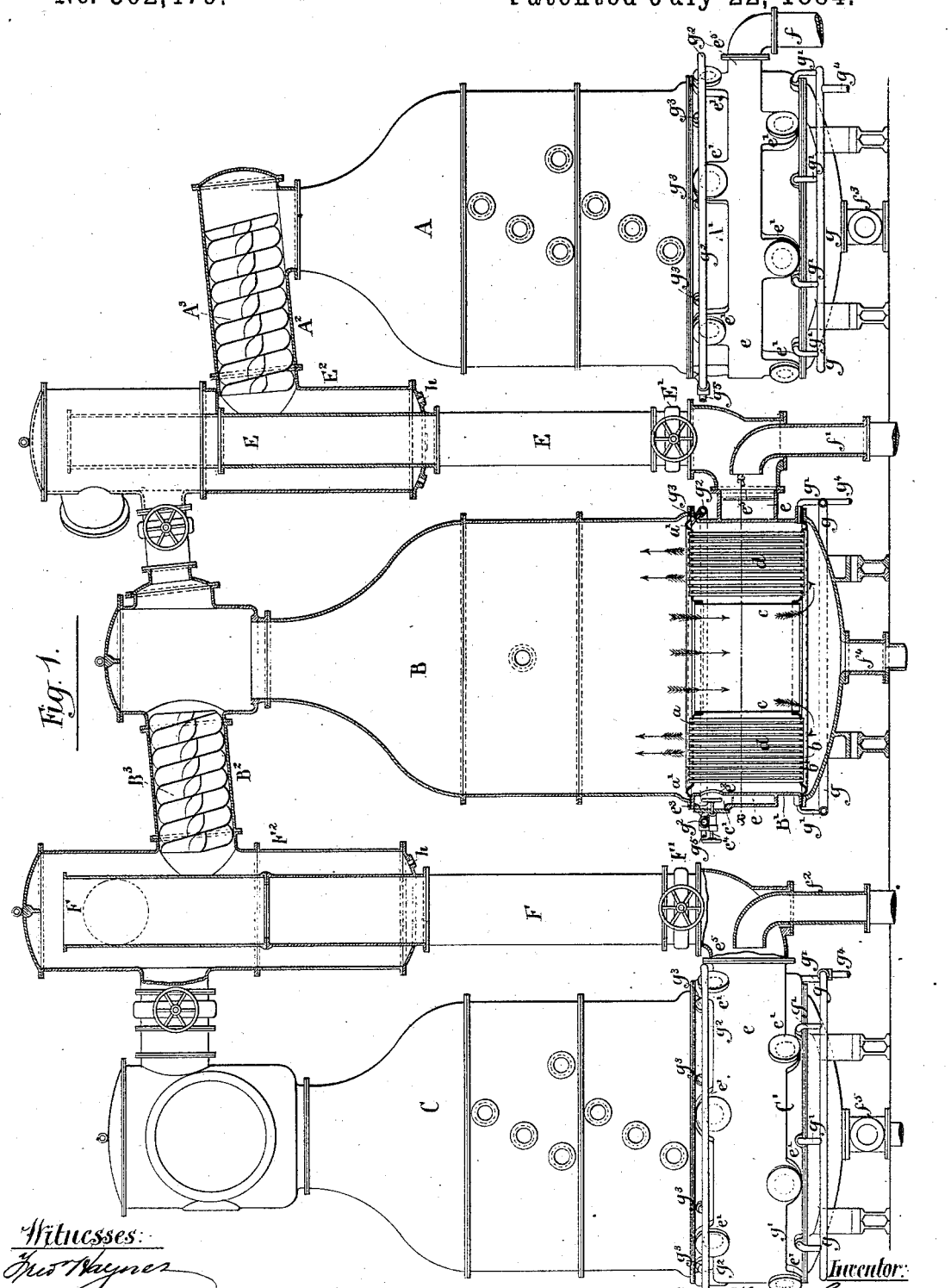
Figure 2:
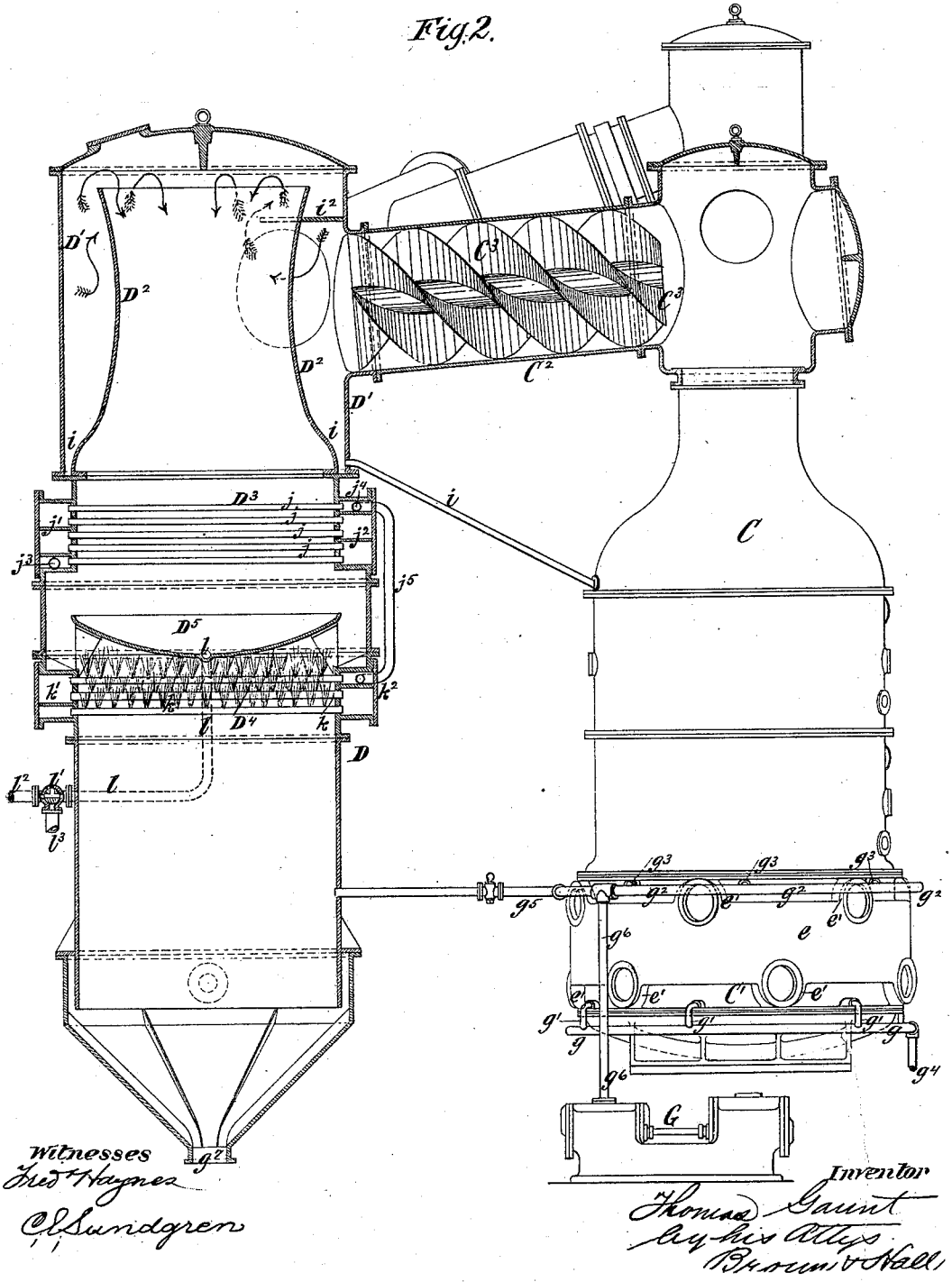
Figure 3:
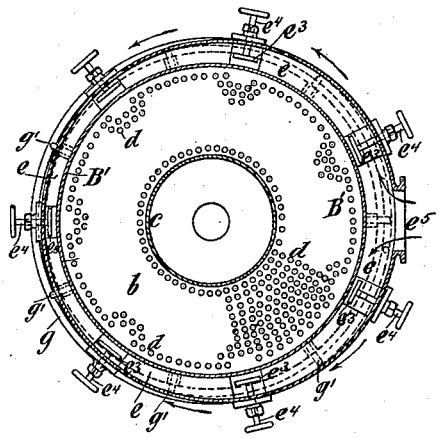
Figure 4:
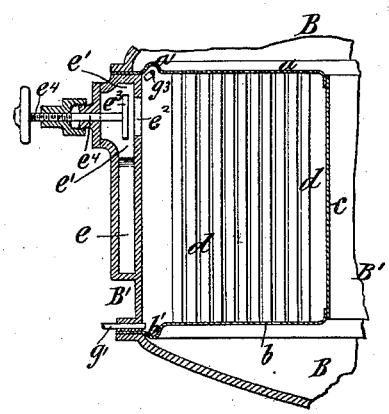
Figure 5:
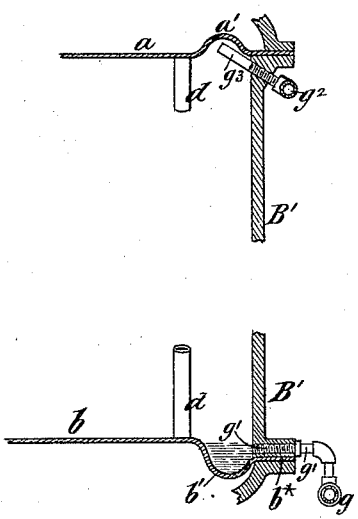

In the accompanying drawings, Figure 1 represents an elevation, partly in section, of a series of three pans embodying my invention and connected for triple effect. Fig. 2 represents an elevation, partly in section, of the last or vacuum pan of the series and a condenser with which said pan is connected. Fig. 3 is a horizontal section on the dotted line $x\,x$, Fig. 1, showing the drum-section of one of the pans. Fig. 4 is a vertical section, on a larger scale, illustrating certain portions of the drum-section; and Fig. 5 is a vertical section, on a still larger scale, illustrating certain portions of the drum-section.

Similar letters of reference designate corresponding parts in all the figures.

A B C designate the three pans of the series, and D designates the condenser, with which the last or vacuum pan C of the series is connected. As here shown, the three pans have in their lower portions drum-sections A' B' C', and in Fig. 1 the second pan, B, of the series is shown in full vertical section. The drum-section A' C' of the pans A and C are like that, B', of the pan B, and a description of the drum-section of the pan B only will be necessary. The drum-section is formed, in the usual way, by upper and lower tube-plates or diaphrams, $a\,b$, which extend horizontally, and are clamped and held at the edges between the sections of which the pan is composed. These plates $a\,b$ have large central openings connected by a large tube or throat-piece, $c$, which forms a large passage between the portions of the pan above and below the drum-section, and the said tube-plates are connected by a great number of small upright tubes, $d$, which form a great number of small passages between the portions of the pan above and below the drum-section. When steam is circulated through the space between the tube-plates $a\,b$ and among all the tubes $d$, an active upward circulation of the cane-juice or saccharine liquor will be produced through the tubes $d$, and a corresponding downward circulation through the large throat or passage $c$, as shown by the arrows in Fig. 1. This drum-section, so far as described, is not new; but it comprises certain novel features, which I will now describe, and which render it much more effective.

Each of the drum-sections A' B' C' is surrounded by a circumferential belt, $e$, having upward and downward extensions or pockets $e'$, which are alternated—that is, the lower extensions or pockets, $e'$, are placed between the upper extensions or pockets, as best shown in the case of the pans A C. Opposite each of these belt-extensions or pockets $e'$ is an opening, $e^2$, into the interior of the drum-section, and each of such openings is controlled by a valve or damper, $e^3$, which may be operated by a stem, $e^4$, from the exterior of the belt $e$. Such a valve or damper is shown in the case of the pan B, Fig. 1, and also in Fig. 4, which represents a portion of the drum-section on a larger scale; and it will be understood that there is such an opening $e^2$ controlled by such a damper $e^3$ opposite each of the belt-extensions $e'$, although they are not here shown. The arrangement of these dampers $e^3$ around the circumference of the drum-section is illustrated in Fig. 3. Steam enters the steam-belts $e$ of the several pans through inlet-throats $e^5$, and passes from the inlet in opposite directions around the drum-section, as shown by the arrows in Fig. 3. Steam enters the belt of the pan A direct from a steam-boiler through a supply-pipe, $f$, but steam passes to the belt $e$ of the pan B by a pipe, E, from the pan A, and to the belt $e$ of the pan C by a pipe, F, from the pan B, a triple effect being thereby produced. The pipes E F are provided with valves E' F', and pipes $f'$ $f^2$ enter the said pipes E F, so that steam may be supplied direct from the steam-boiler, if desired. If the pan A is to work in direct connection with the condenser D, the valve E' is closed, and the belt $e$ of the pan B is supplied with steam from the pipe $f'$, while if the pan B is to work in direct connection with the condenser D the valve F' is closed, and the pan C is supplied with steam from the pipe $f^2$. Such a method of working pans is well understood. By the use of the steam-belt $e$ and the numerous openings $e^2$ around the circumference of the drum-section a very perfect distribution of the steam among the tubes $d$ of the drum-sections is secured, and such tubes are rendered uniformly effective in heating the contents of the pan, a much better effect being thus obtained than when the steam enters the drum-section at one or two points only in its circumference. The dampers $e^3$ are not any of them intended to be entirely closed, so as to prevent the passage of any steam through the openings which they control; but they are intended to be adjusted independently of each other to effect as nearly as is possible the uniform distribution of steam through all the numerous openings $e^2$. The capacity of the belt $e$ should be greatest near the inlet $e^5$, and as the steam in its passage around the drum-section enters the latter through one after another of the openings $e^2$, a less and less capacity is necessary for the belt, or else the steam remaining in the belt will expand and have a sluggish movement in the belt. To this end I make the belt $e$ slightly eccentric to the outer shell of the drum-section, as best shown in Fig. 3, thus giving the belt its greatest capacity at the inlet $e^5$ and its least capacity at the point diametrically opposite the inlet, thus forming a passage for the steam, which tapers gradually in opposite directions from the inlet $e^5$.

Instead of the opening $e^2$ and belt-extensions or pockets $e'$ being arranged alternately in two horizontal planes, as shown, any other arrangement of openings leading from the belt into the drum-section may be adopted; but I consider this arrangement the most desirable. The lower portion of each pan is surrounded by an annular pipe, $g$, which is connected at intervals around the circumference by branches $g'$ with the lower portion of the drum-section, and a second annular pipe, $g^2$, which is connected by branches $g^3$ with the upper portion of the drum-section. The water of condensation is taken from the lower pipe, $g$, by a branch, $g^4$, by means of a barometric leg or by the "sweet-water" pump commonly used in sugar apparatus, and the air-pipe $g^2$ is connected with the air-pump used in connection with the condenser, either directly or through the condenser.

In Fig. 2 I have shown the air-pipe $g^2$ of the pan C as connected with the condenser D by a pipe, $g^5$, and a vacuum being maintained in the condenser by the air-pump used in connection therewith, the air will be drawn off positively from the heating or drum section, instead of simply being allowed to escape into the atmosphere. Fig. 2 also shows the air-pipe $g^2$ as connected by a pipe, $g^6$, directly with an air-pump, G, and this is intended to be connected with the outlet $g^7$ of the condenser D.

In order to afford provision for unequal expansion in the parts of the drum-section, I form in the upper tube-plate, $a$, an annular corrugation or inverted gutter, $a'$, which extends above the general level of the plate, and in the lower plate, $b$, I form a similar annular corrugation or gutter, $b'$, which is below the general level of the plate. These corrugations or gutters also serve an advantageous purpose in connection with the branch pipes $g'$ $g^3$, and this feature is best shown in Fig. 5, which represents portions of the tube-plates $a$ $b$ and adjacent parts on a larger scale. It will be there seen that the outer rim, $b^3$, of the plate $b$ is slightly below the level of the principal portion of the plate wherein are inserted the tubes $d$, and that the branch pipe $g'$ is below the level of the last-mentioned portion of the plate. The water of condensation will all flow into the annular gutter $b'$, and from this gutter the water is drained by the branch pipes $g'$, thereby keeping the tube-surface of the plate $b$ entirely free from water. As before stated, the corrugation or inverted gutter $a'$ in the upper tube-plate, $a$, is raised above the general level of the said plate, and the branch pipes $g^3$ extend upward into this corrugation or gutter, as shown in the upper part of Fig. 5, and thereby take the air therefrom.

The pipes $g^4$ and $g^5$, for taking the water of condensation and the air from the drum-section, are to be provided with valves, whereby the passage through them may be controlled. These valves are usually left slightly open, and a little experience will enable the attendant to leave them constantly open, just enough to keep the drum-section clear of water and air without allowing steam to escape. The pans A B C are provided with the usual outlets, $f^3$ $f^4$ $f^5$, at the bottom. The upper portions of the pipes E F are inclosed by jackets or receivers E² F², and are open at the top. The upper portion of the pan A is connected by a pipe or passage, A², with the jacket or receiver E². The upper part of the pan B is connected by a pipe or passage, B², with the jacket or receiver F², and the upper part of the pan C is connected by a pipe or passage, C², with the upper part of the condenser D, as shown in Fig. 2.

In the operation of the pans by double or triple effect the vapors from the pan A pass through the pipe or passage A² into the receiver E², and there deposit a part of the saccharine matter carried over by the vapor, which may be taken off by a pipe attached at $h$, while the vapor passes upward to the open end of the pipe E, and thence downward through the pipe E to the heating-drum of the pan B. In like manner the vapor from the pan B passes through the pipe or passage B² into the receiver F², and there deposits a part of the saccharine matter carried over from the pan B, while the vapor passes down the pipe F to the heating-drum of the pan C.

In order to secure a far more perfect and complete separation of the water and sugar-vesicles from the vapor, I arrange in the pipes or passages A², B², and C² spiral conductors A³, B³, and C³, which may be composed of sheet metal, and which are stationary in the said pipes or passages. By these spiral conductors the vapor is caused to follow a spiral course, or is given a whirling or rotary motion in its passage through the pipes or passages, and the convolutions of the spirals being of comparatively quick pitch, such a centrifugal force will be generated as will cause the water and the sugar vesicles carried by the vapor to be thrown outward against the interior of the pipe or passage. The pipe or passage being inclined, the water and the sugar-vesicles thus deposited on the interior of the pipe or passage will flow or run toward the lower end thereof and into the receiver E² F², or into the condenser D, as the case may be, while the vapor or comparatively dry steam will pass down the pipe leading to the drum-section of the next pan. The spiral conductors A³, &c., may with advantage be multiple threaded, so as to cause the vapor to travel a greater distance in its passage through the pipe.

By the use of the above-described spiral conductor I secure a more complete separation of water and saccharine matter from the vapor than has been heretofore possible, and at the same time I obtain drier steam for heating the drum-section of the next pan of the series. Where a single vacuum-pan is connected directly with a condenser I may arrange a spiral conductor of the kind shown in the pipe connecting the pan and condenser, and may incline the pipe toward the pan or extend it nearly upright from the pan, so that the water and saccharine matter deposited on its interior will flow backward and downward into the pan.

Referring now more particularly to Fig. 2, the vapor passes from the pan C through the pipe C² and enters the upper part, D′, of the condenser-casing. Within said part D′ of the condenser-casing is arranged an upwardly-extending annular partition or casing, D², which, as here shown, is flaring toward its ends, or of wine-glass shape. The space between the lower portion of the parts D′ D² forms a receiver, $i$, wherein saccharine liquor is deposited, and thence conducted by a pipe, $i'$, to the vacuum-pan C or to the sweet-water pump.

Between the partition or wine-glass casting D² and the outer case, D′, of the condenser is a guard-plate, $i^2$, whereby the vapor is prevented from rising directly at the point where it enters from the pipe C², and is caused to circulate around the partition D², so as to retain as much as possible of the saccharine liquor in the receiver $i$. The vapor is thereby cooled, and thence passes down within the separating-partition D², as indicated by the arrows, to the condenser proper. The condenser proper comprises two portions, a surface-condensing portion, D³, and a jet-condensing portion, D⁴, the former being arranged above the latter. The surface-condensing portion D³ consists of horizontal tubes $j$ and water-chests $j'\ j^2$, arranged on opposite sides of the condenser. The jet-condensing portion D⁴ consists of tubes $k$, which are perforated, so as to shower water, as shown, and water-chests $k'\ k^2$, arranged in opposite sides of the condenser. The water-inlet for the condenser is at $j^3$, and from this point the cooling-water passes horizontally back and forth across the condenser through the tubes $j$ and water-chests $j'\ j^2$, and finally escapes at $j^4$ through a pipe, $j^5$, by which it passes to the water chest $k^2$, and thence through the tubes $k$, from which it is showered.

Below the surface-condensing portion D³, and between it and the jet-condensing portion D⁴, is a detector or receiver, D⁵, which consists simply of a pan or shallow bowl, into which the liquor resulting from the condensation of the vapor in its passage over the pipes $j$ of the surface-condensing portion D³ is caught, and from which such liquor is taken off by a pipe, $l$. The pipe $l$ is provided with a cock, $l'$, controlling two outlets, $l^2\ l^3$, and when the liquor obtained from the receiver or detector D⁵ through the pipe $l$ is found to be sufficiently saccharine to render it valuable it may be discharged through the branch or outlet $l^2$ and used as sweet liquor; but otherwise it may be discharged through the branch or outlet $l^3$, and allowed to run to waste.

By the use of the surface-condensing portion D³ and pan D⁵, I am enabled to save sweet water, which would all be lost in a jet-condenser, and which would be rendered valueless by the further addition of water of condensation if not separated or extracted from the vapor before the complete condensation thereof.

What I claim as my invention, and desire to secure by Letters Patent, is—

1. The combination, in the drum-section of an evaporating-pan, of the upper and lower tube-plates, $a\ b$, connected at the center by a large throat-piece or tube, $c$, and formed with the corrugations $a\ b'$, and the small tubes $d$, all substantially as described.

2. In a drum-section for heating an evaporating-pan, the combination of upper and lower tube-plates, $a\ b$, the former having the raised corrugation or inverted gutter $a'$, the large throat $c$, providing for a downward circulation, and the tubes $d$, providing for an upward circulation, and a pipe for removing air from the drum-section, entering the said corrugation $a'$, all substantially as described.

3. In a drum-section for heating an evaporating-pan, the combination of upper and lower tube-plates, $a\ b$, the latter having the depressed corrugation or gutter $b'$, the large throat $c$, providing for a downward circulation, the tubes $d$, providing for an upward circulation, and a pipe for taking off the water of condensation from the corrugation or gutter $b'$, all substantially as described.

4. In an evaporating apparatus, the combination, with an evaporating-pan containing a "drum-section" for heating the contents of the pan by steam, a pipe for taking off the water of condensation from the lower part of said drum-section, a condenser and air-pump, and a pipe extending from the upper part of said drum-section, and connected with the air-pump for taking off the air from said drum-section, substantially as described.

5. The combination, in an evaporating-pan, with a drum-section composed of horizontal tube-plates, tubes providing for an upward circulation, and a large throat or passage providing for a downward circulation, of a steam-belt extending circumferentially around the drum-section, and provided with openings communicating with the interior of the drum-section at intervals in its circumference, substantially as described.

6. The combination, in an evaporating-pan, with a drum-section composed of horizontal tube-plates, tubes providing for an upward circulation, and a large throat or passage providing for a downward circulation, of a steam-belt encircling the drum-section, and communicating therewith at intervals around its circumference, the said steam-belt being eccentric to the drum-section, and having a steam-inlet on the side which has the greatest projection, substantially as and for the purpose described.

7. The combination, in an evaporating-pan, with a drum-section composed of horizontal tube-plates, tubes providing for an upward circulation of the contents of the pan, and a large throat or passage providing for a downward circulation of the contents of the pan, of a steam-belt encircling the drum-section, and communicating therewith by openings at intervals in the circumference, and dampers or valves whereby the passage of steam through the several openings may be separately controlled, substantially as described.

8. The combination, with the drum-section composed of tube-plates $a\ b$, throat $c$, and tubes $d$, of the encircling steam-belt $e$, provided with the steam-inlet $e^5$, and communicating with the interior of the drum-section by upper and lower openings, $e^2$, which are alternated around the circumference of the drum-section, substantially as described.

9. The combination, with an evaporating-pan, of an outlet-pipe for conducting away the vapor, and a spiral conductor arranged in said pipe, whereby the vapor and matters in suspension therein are caused to have a rapid whirling or rotary motion in their passage through said pipe, substantially as and for the purpose described.

10. The combination, in a condenser for sugar-evaporating pans, of the outer casing, $D'$, and the annular partition $D^2$, forming between them the receiver $i$, for sweet water, and the pipe $C^2$, for admitting vapor entering below the top of the partition $D^2$, substantially as described.

11. The combination of the outer casing, $D'$, and the annular partition $D^2$, forming between them the receiver $i$, the pipe $C^2$, entering below the top of the partition $D^2$, and the guard-plate $i^2$, all substantially as described.

12. In a condenser for sugar-evaporating pans, the combination of an upper surface-condensing portion, over which the vapor passes in a downward direction, a pan or bowl arranged below said surface-condensing portion for catching the water of condensation, a pipe extending from said pan or bowl for taking off such water, and a lower condensing portion below the pan or bowl for completing the condensation of the remaining vapor, substantially as herein described.

13. The combination of the upper surface-condensing portion, $D^3$, the pan or detector $D^5$ and its pipe $l$, the jet-condensing portion $D^4$, and a pipe, $j^3$, for conducting water to the jet-condensing portion $D^4$ after its passage through the surface-condensing portion $D^3$, substantially as herein described.

THOMAS GAUNT.

Witnesses:
 FREDK. HAYNES,
 ED. L. MORAN.